US007257513B2

(12) United States Patent
Lilly

(10) Patent No.: US 7,257,513 B2

(45) Date of Patent: Aug. 14, 2007

(54) PERFORMANCE MONITORING SYSTEM AND METHOD

(75) Inventor: Brendon Lilly, East Brisbane (AU)

(73) Assignee: Leica Geosystems AG, Heerbrugg (CH)

(*) Notice: Subject to any disclaimer, the term of this patent is extended or adjusted under 35 U.S.C. 154(b) by 24 days.

(21) Appl. No.: 10/501,945

(22) PCT Filed: Jan. 24, 2003

(86) PCT No.: PCT/AU03/00077

§ 371 (c)(1), (2), (4) Date: Oct. 12, 2004

(87) PCT Pub. No.: WO03/063032

PCT Pub. Date: Jul. 31, 2003

(65) Prior Publication Data

US 2005/0049831 A1 Mar. 3, 2005

(30) Foreign Application Priority Data

Jan. 25, 2002 (AU) .................................... PS0173

(51) Int. Cl.
*G06F 17/00* (2006.01)

(52) U.S. Cl. ........................ 702/182; 702/189; 701/29; 701/35; 700/111; 379/265.06; 703/6

(58) Field of Classification Search .................. 701/29, 701/35; 702/182–185, 187–197, 180, 181; 705/11; 700/111; 379/265.06; 703/6
See application file for complete search history.

(56) References Cited

U.S. PATENT DOCUMENTS

| | | | | |
|---|---|---|---|---|
| 5,465,079 | A | 11/1995 | Bouchard et al. | |
| 5,659,470 | A * | 8/1997 | Goska et al. | 701/35 |
| 5,821,860 | A | 10/1998 | Yokoyama et al. | |
| 6,134,541 | A * | 10/2000 | Castelli et al. | 707/2 |
| 6,137,909 | A * | 10/2000 | Greineder et al. | 382/190 |
| 6,789,047 | B1 * | 9/2004 | Woodson | 702/182 |
| 6,795,799 | B2 * | 9/2004 | Deb et al. | 702/188 |
| 6,873,918 | B2 * | 3/2005 | Curless et al. | 702/36 |
| 2001/0032156 | A1 * | 10/2001 | Candura et al. | 705/36 |
| 2002/0116156 | A1 * | 8/2002 | Remboski et al. | 702/188 |
| 2005/0159851 | A1 * | 7/2005 | Engstrom et al. | 701/1 |

FOREIGN PATENT DOCUMENTS

DE 198 60 248 C1 3/2000

* cited by examiner

*Primary Examiner*—John Barlow
*Assistant Examiner*—Elias Desta
(74) *Attorney, Agent, or Firm*—Oliff & Berridge, PLC

(57) ABSTRACT

A system and method for monitoring the performance of at least one machine operator, the system comprising at least one measuring device for measuring at least one machine parameter during operation of the machine by the operator, a server (8) for generating at least one performance indicator distribution from measurements of the at least one machine parameter and a performance indicator calculation module (18) for calculating at least one performance indicator from the at least one performance indicator distribution. Feedback may be provided to the operator by displaying the at least one performance indicator in substantially real-time to the operator on display module (6) onboard the machine.

23 Claims, 7 Drawing Sheets

OPERATOR PERFORMANCE TREND REPORT
Time Period: 13 Aug 2001-14 Aug 2001
Machines: All machines
Dig Mode: All Dig Modes
OPERATOR: Joe Bloggs <u>Fill Time</u> Minimum: 43% Maximum: 72% Average: 65%

<u>OVERALL</u> Minimum: 43% Maximum: 72% Average: 65%

OPERATOR RANKING REPORT Time Period: 13 Aug 2001-14 Aug 2001

Machines: All machines
Dig Mode: All Dig Modes

Fill Time

| Ranking | Operator | Average Score | Machine |
|---|---|---|---|
| 1 | Joe Bloggs | 68% | DRE15 |
| 2 | Harry Smith | 66% | DRE8 |
| 3 | John Smith | 58% | DRE15 |

Swing Time

| Ranking | Operator | Average Score | Machine |
|---|---|---|---|
| 1 | John Smith | 90% | DRE15 |
| 2 | Joe Bloggs | 85% | DRE15 |
| 3 | Harry Smith | 82% | DRE8 |

OVERALL

| Ranking | Operator | Average Score | Machine |
|---|---|---|---|
| 1 | John Smith | 90% | DRE15 |
| 2 | Joe Bloggs | 85% | DRE15 |
| 3 | Harry Smith | 82% | DRE8 |

FIG 11

PERFORMANCE MONITORING SYSTEM AND METHOD

The invention relates to a performance monitoring system and method. In particular, although not exclusively, the invention relates to a system and method for monitoring the performance of equipment operators, particularly operators of draglines and shovels employed in mining and excavation applications or the like.

BACKGROUND TO THE INVENTION

In many fields of manufacturing and industry, it is desirable or necessary to monitor the performance of equipment operators in addition to the equipment itself. This may be for managerial purposes to ensure that operators are complying with a minimum required standard of performance and to help Identify where improvements in performance may be achieved. Monitoring performance may also be desired by an operator to provide the operator with an indication of their own performance in comparison with other operators and to demonstrate their level of competence to management.

One field in which performance monitoring is required is the operation of draglines and shovels and the like as used in large-scale mining and excavation applications. For commercial purpose, it is important that an operator is operating a piece of machinery to the best of the operator's and the machine's capabilities.

There are however many factors that need to be measured and considered to enable fair and useful comparisons to be made between different operators, between different machines, between present and previous performances and between different operating conditions.

It is therefore desirable to provide a system and/or method capable of achieving this objective. Furthermore, it is desirable that performance-monitoring information is promptly available to inform management and operators alike of current performance.

DISCLOSURE OF THE INVENTION

According to one aspect, although it need not be the only or indeed the broadest aspect the invention resides in a method for monitoring performance of at least one machine operator, the method including the steps of:

measuring at least one machine parameter during operation of the machine by the operator;

generating at least one performance indicator distribution from measurements of the at least one machine parameter; and, calculating at least one performance indicator from the at least one performance indicator distribution.

The method may further include the step of providing feedback to the operator by displaying the at least one performance indicator in substantially real-time to the operator. Alternatively, the at least one performance indicator may be displayed to the operator once the machine has completed an operation cycle.

Suitably, the at least one machine parameter may be a dependent machine parameter. Alternatively, the at least one machine parameter may be the sole parameter represented by a particular performance indicator.

The method may further include the step of segmenting at least one of the dependent machine parameters into segments, the range of each segment constituting a segmentation resolution.

Suitably, the step of segmenting at least one of the dependent machine parameters includes specifying a magnitude of the range for each segment of each dependent machine parameter requiring segmentation.

Suitably, at least one dependent machine parameter may not require segmentation.

Suitably, the step of generating the at least one performance indicator distribution may comprise using a mixture of one or more distributions to model the performance indicator distribution. The number of mixtures may be set dynamically.

Suitably, the at least one performance indicator distribution may be generated using an algorithm. The algorithm may be an LBG algorithm. Alternatively, the at least one performance indicator distribution may be generated using a linear ranking model (LRM).

Suitably, two or more performance indicators may be combined to yield an overall performance rating of the machine operator. One or more of the performance indicators may be positively or negatively weighted with respect to the other performance indicator(s).

According to another aspect, the invention resides in a system for monitoring performance of a machine operator, the system comprising:

at least one measuring device for measuring at least one machine parameter during operation of the machine by the operator;

a server for generating at least one performance indicator distribution from measurements of the at least one machine parameter; and, a performance indicator calculation module for calculating at least one performance indicator from the at least one performance indicator distribution.

Preferably, the server is remote from the machine.

Suitably, the server comprises storage means, communication means and a performance indicator distribution calculation module.

Suitably, the performance indicator calculation mode is onboard the machine.

Preferably, the performance calculation module is coupled to communication means for transmitting and receiving data to and from the sender.

Preferably, the system further comprises at last one display device for displaying the at least one performance indicator in substantially real-time to the operator. Alternatively, the at least one performance indicator may be displayed to the operator once the machine has completed an operation cycle. The at least one display device may be situated in, on or about the machine and/or remote from the machine.

Suitably, the communication means comprises a transmitter and a receiver.

Further aspects of the invention become apparent from the following description.

BRIEF DESCRIPTION OF THE DRAWINGS

To assist in understanding the invention and to enable a person skilled in the relevant art to put the invention into practical effect preferred embodiments will be described by way of example only and with reference to the accompanying drawings, wherein:

FIG. 11 shows an Operator Ranking Report.

DETAILED DESCRIPTION OF THE INVENTION

Figure 1:
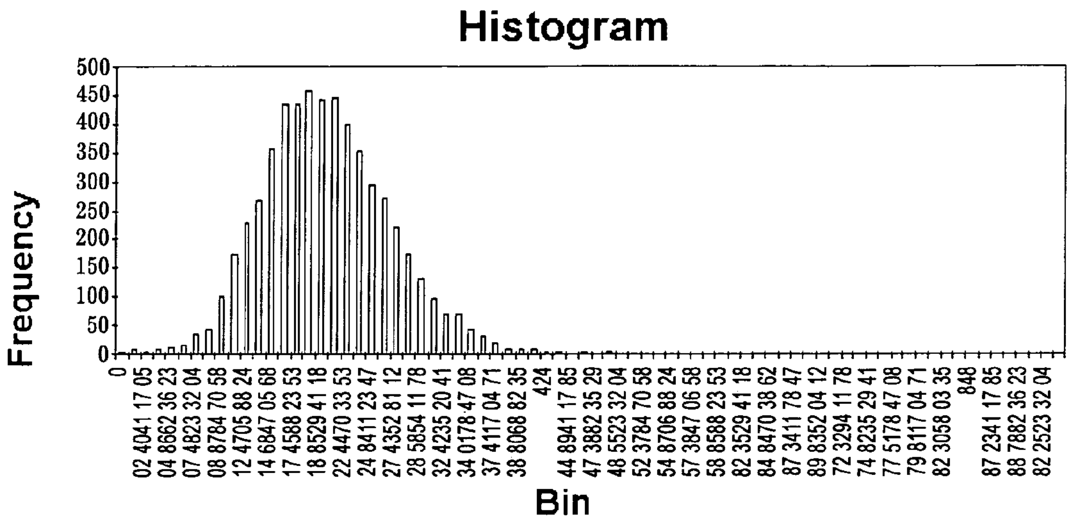
FIG. 1 shows a distribution of data representing a production key performance indicator (KPI)

The present invention monitors one or more parameters or variables of a machine to provide an accurate indication of how well an operator is performing, for example, in comparison with other operators for the same machine and/or in comparison with performances of the same operator.

Although the present invention will be described in the context of monitoring the performance of machine found on a mining site, it will be appreciated that the present invention is applicable to a wide variety of machines found in various situations and performance monitoring is required.

A machine parameter may itself be referred to as a key performance indicator (KPI). Alternatively, a KPI may be dependent on one or more machine parameters. The KPIs may be represented and displayed as a percentage or a score, such as points scored out of 10, that describes how well the operator is performing for a given parameter and/or KPI. A high percentage value, such as >90% for example, shows that the operator is performing extremely well. A mid-range value for a KPI, such as 50% for example, shows that the operator's performance is about average and less than this example percentage demonstrates that their performance is below average for that KPI.

Each KPI parameter is related to the performance of an operator for one or more given machine parameters such as fill time, cycle time, dig rate, and/or other parameter(s). KPIs are a measure of how the operator is performing for the particular parameter related to that KPI compared to the to operators. The performance of, or rating for, a particular operator is calculated using. In part previous data record for the machine and provides an indication of whether or not the operator is improving. The process for measuring the parameter and achieving the KPIs is described In detail hereinafter.

The parameter data is acquired using conventional measuring equipment such as sensors, timing means and the like and the particular equipment required to acquire the data would be familiar to a person of ordinary skill in the relevant art.

Different comparisons the data are also possible. The current operator of a machine can be compared to all the other operators of the same machine or to the operator's previous performance(s). This shows how well they perform against them and shows them whether they are improving respectively.

One Important consideration of the present invention is filtering the data from all the machines that may be present in, for example, a mine site or other situation to enable fair and meaningful comparisons to be made. Various factors that may affect KPI parameters are as follows:

Machine: Each machine possess different operating characteristics and therefore the data from one machine will not reflect the performance of operating another machine.

Dig Mode: Different dig modes are possible with a single machine and these may differ between different machines, which is significant. In the present invention operators can enter a particular dig mode corresponding to the mode of operation of the machine. The selected dig mode must be correct otherwise the KPIs may be mis-represented and provide misleading results.

Operator: Operators can compare their performance against their own previous performances to verify whether they are improving. Operator can also compare their performances against those of other operators.

Location: Different locations in the mine will have different digging conditions even though the digging made may be the same. This may be represented by the specific gravity (s.g.) or by an Index that describes the current digging difficulty, known as the dig index.

Bucket: Some KPIs will be affected by the type of bucket being used on the dragline. For example, different size buckets, which are usually pre-selected on the basis of the application, may produce different dig rates. For comparison purposes, an operator should not be disadvantaged when using a smaller bucket.

Bucket Rigging: If this factor changes, but the bucket does not, the KPI results may be affected.

Weather: The weather can change the digging conditions and therefore affect the performance attained by the operator.

Some of the above parameters are readily filtered from the data, such as machine, dig mode, operator, bucket and possibly location. The more the data is divided however, the more data need to be processed, stored and transmitted from the server 8 to the onboard computer module 4 (shown in FIG. 6), to implement the KPIs. To reduce this volume of data the location parameter could optionally be omitted, since location data is generally reflected in the bucket type being used. Weather and bucket rigging are more difficult to filter. Therefore, the parameter filters of machine, dig mode and bucket mode. These parameter filters may be combined with the operator parameter filter.

If the data of all operators are to be compared, the operator filter is omitted. When filtering by operator the number of operators multiplies the amount of data for the mine comparison. For example, if there are 1000 byte of KPI data to download to the module for the mine data and there are 100 operators, then this equates to a total of 101,000 bytes of KPI data to download, which represents 100 data sets for 100 operators plus one data set for the all operator comparison.

This large data problem is one of the problems addressed by the present invention, which enables the present invention to provide substantially real-time monitoring of operators' performance.

The large data problem can be solved in a number of ways. One option is to only download KPI data for the operators that exist in the recorded data in the database. Alternatively, only KPI data for operators that have ever logged onto a particular machine, which is stored in an operator profile, may be downloaded. For any new operator who logs on, the data is requested and downloaded. If the data does not exist in the database, then the display can show that there is no KPI data for that operator. Another alternative is to just download the KPI data for the operator that just logged on.

Even with the data filtering described above, a single value such as fill time, cannot be compared to other fill times unless one or more dependencies are introduced. Some KPIs, such as the Machine Reliability KPI, do not require a dependent parameter, but many do, such as the Swing Production KPI. A dependent parameter adds another level of filtering to the data that is specific to the parameter being ruled.

A simple example is the Swing Production KPI. The time taken to swing a dragline, for example, is directly related to the angle through which the dragline swings (Swing Angle) and the vertical distance the bucket travels from the end of a fill to the top of a dump of the bucket contents. These dependencies are included in the KPI calculation by segmenting each of the dependent parameters into ranges. The range of the segment is called the segmentation resolution. The swing angle in this example could be divided into 10-degree increments over, for example, 380 degrees. If the vertical distance is ignored in this example, this would provide 36 data segments.

To calculate the KPI, the data recorded from that machine is sorted, for example, by dig mode, for each of the segments. For the data associated with each segment, a KPI distribution is calculated. Therefore, for the Swing Production KPI example, the swing times for each angle segment are extracted and a distribution of times is calculated for each segment. Thus, 36 distributions would be calculated in total. The actual swing times and swing angles are measured onboard the machine using conventional timing and angle measuring instrument that are familiar to those skilled in the relevant art. The distribution associated with the swing angle segment being measured is then selected to calculate the KPI.

Introducing more dependent variables creates the problem of producing more data segments, which in turn means more distributions and more data. In the example above, if the vertical distance was included and divided into, for example, 10 meter segments from 0 to +70 metres (7 segments), there would be 252 (36×7) distributions to calculate and download to the machine just for the Swing Production KPI.

The volume of data can be reduced by carefully designing the segmentation of the dependent parameters. One way is to include extremities in the segmentation, which allows only segmentation of the areas that are common. In the above example, the swing angle could be re-segmented such that one segment contains swing angles less than, for example 30 degrees and another segment contains swing angles greater than, for example, 200 degrees whilst maintaining the 10-degree segments between 30 degrees and 200 degrees. This re-segmentation results in 19 segments for the swing angle parameter compared with 36 in the previous example.

The vertical height dependency could be reduced to 2 segments by identifying the height at which the swing velocity is reduced (i.e. for hoist dependent swings). Less than this height is one segment and above this height is another. This reduces the total number of segments to 38 (2×19) segments.

As described In the forgoing, a distribution for each segment of the KPI that is dependent on some other parameter. Finding a distribution that describes the KPI data is not trivial. Even though the sampled data looks Gaussian in nature, the graphs are skewed and comprise some data at the extremities.

FIG. 1 shows some data taken for the KPI representing production. All the offer KPIs show a similar distribution. FIG. 1 shows a positive skew In the data and some data to the right of the graph. A simple Gaussian would model most of this data quite adequately. However, it cannot be judged how the data will skew or how the distribution will change once the KPI Information is available to the machine operator. It is likely that the distribution will become more positively skewed and less Gaussian like.

One solution to this problem is to model the data with a multi-modal or multi-variant Gaussian mixture in which a mixture of different Gaussian distributions are used to model each KPI distribution. This has the advantage that the number of mixtures can be changed depending on the data. If the data is very Gaussian-like, then a single mixture comprising a simple Gaussian distribution may be used. If the data is very obscure, then a plurality of mixtures can be used to describe the distribution.

The number of mixtures depends on the data that is being modeled and the number of mixtures may be set dynamically. With sufficient data, an algorithm could be employed to determine the maximum number of mixtures required to represent the KPI distribution. If there is only a small amount of data, for example less than a selectable threshold of 10 samples, then modeling may be carried out using a single mixture. If the algorithm does not converge with the maximum number of mixtures, the highest number of mixtures that cause the algorithm to converge can be used.

One algorithm that could be used to generate the distributions from the data is a Linde-Buz-Gray (LBG) algorithm, which is known to persons skilled in the relevant art. The algorithm is an iterative algorithm that splits data into a number of clusters. The algorithm is designed for vectors, but in the present invention, single dimension vectors (single values) are used, thus simplifying the algorithm.

The detail of the LBG algorithm will now be described. $X_m=\{x_1,x_2, \ldots, x_M\}$ is the training data set consisting of M data samples. $C_n=\{c_1,c_2, \ldots, c_N\}$ are the centroid calculated for N clusters. c is the iteration conversion coefficient, which is usually fixed to a small value greater than zero, such as 0.0.1.

The steps for generating the KPI distributions are as follows:

1. N=1 and given X, calculate initial centroid $C_1$ by calculating the mean:

$$C_1 = \frac{1}{M}\sum_{m=1}^{M} x_m$$

2. Calculate the initial distortion of the data for the initial centroid:

$$D_{avg}^0 = \frac{1}{M}\sum_{m=1}^{M} |x_m - c_1|^2$$

3. Set iteration index l=0.
4. Find the cluster p with the maximum distortion.
5. Increment the number of clusters: N=N+1
6. Split cluster p into 2:

$$c_P=(1+\epsilon)c_P$$

$$c_M=(1-\epsilon)c_P$$

7. For all $1 \leqq m \leqq M$ in the data set X, record the nearest centroid $c_{n^*}^{(i)}$ where n* is the index of the centroid:

$$Q(x_m)=c_{n^*}^{(i)},$$

and the total number of values assigned to each centroid $T_n$.

8. Calculate the new centroids:

$$C_m^{(j+1)} = \frac{\sum_{Q(x_m)=c_m^{[j]}} x_m}{\sum_{Q(x_m)=c_m^{[j]}} 1} \quad \text{or}$$

$$C_m^{(i+1)} = \frac{\sum_{Q(x_m)=c_m^{[j]}} x_m}{T_m}$$

9. i=i+1.

10. Calculate the average of the minimum distortion between the data sample and its closest centroid:

$$D_{avg}^1 = \frac{1}{M}\sum_{m=1}^{M} |x_m - Q(x_m)|^2$$

11. If $(D_{avg}^{(i-1)} - D_{avg}^{(i)})/D_{avg}^{(i-1)} > \epsilon$, then go back to step 7.

12. Save the temporary calculation centroids in a secure location.

13. If the number of desired clusters has not been reached, then go back to Step 4.

The algorithm starts by treating the whole of the data as one cluster. It then divides the cluster into two and iteratively assigns data to each of the clusters until the centroids of the clusters do not move appreciably. Once the iterations converge, the cluster with the greatest spread (accumulative distance between data and centroid) is split and the iterative calculation are repeated. The algorithm continues until the required number of clusters has been reached. The result is data divided into clusters with centroids. The data for each cluster is then used to calculate a mean and standard deviation for that cluster, i.e. a distribution. The weight of each cluster is calculated as the number of data samples in the cluster compared to the total number of data samples. This weight is known as the mixture coefficient.

In order to calculate the KPI from the distributions, the following formula for $$p(x)=\Sigma C_n N(x_p \mu, \sigma)$$

a multi-variant Gaussian distribution is employed:

where p(x) is the probability, $C_n$ is the mixture coefficient and $N(x,\mu,\sigma)$ is represented by the following formula:

$$N(x, \mu, \sigma) = \frac{1}{\sigma\sqrt{2\pi}} e^{-\frac{1}{2}\left(\frac{x-\mu}{\sigma}\right)^2}$$

which is a standard Gaussian distribution with mean $\mu$ and standard deviation $\sigma$.

Another solution to the problem of modeling the data to generate the KPI distributions is to use a Linear Ranking Model (LRM). Instead of modeling the distribution of each of the segments for each KPI, the LRM models the distribution in such a way that only the minimum and maximum boundaries need to be calculated. All values between these limits are then ranked according to their position between the minimum and maximum. This method has the advantage that is distribution independent.

Figure 3:
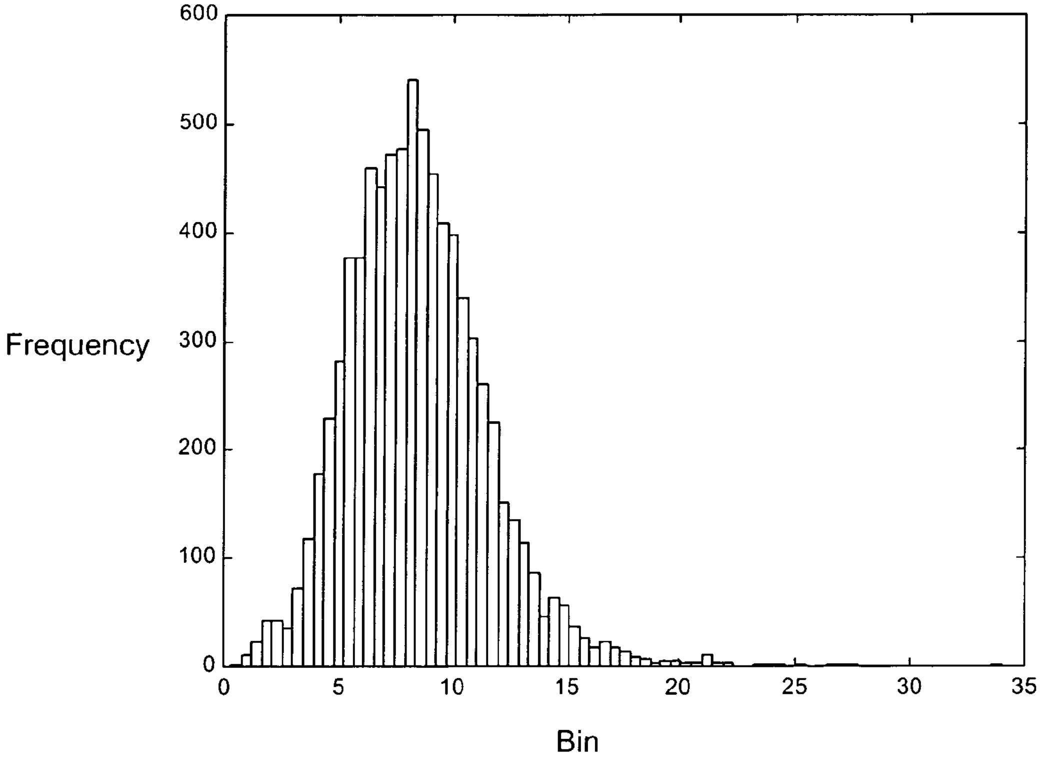
FIG. 3 shows a distribution of Fill Production KPI data.

One problem with the LRM is that is does not handle outlying data very well. For example with reference to the Fill Production data shown in FIG. 3, there is an amount of data to the right of the graph (caused possibly abnormal cycles). The minimum and maximum values respectively on the abscissa are 0.33 and 34 (unit=mass per unit time interval) for this example. This means that the majority of the operators would obtain a low score and very few would obtain a high one since the majority of Fill Production values would occur in the lower half of the range.

A solution to this problem is to filter off the data. This can be achieved by removing data that is more than 3 standard deviations from the mean (keep 99% of the data for true Gaussian curve). The new minimum and maximum are −70 and 17.6. The negative minimum would be set to zero and any values greater than the maximum are then deemed 100%.

Another consideration is that most of the scores obtained by the operator will be around the average because we are modeling a Gaussian-like distribution using a linear model. That is, as most of the data is centered on the mean, the majority of the scores will be around the mean. There is also the consideration that the scores are represented as a percentage, which no longer has a physical meaning. Instead, the operator will receive a score of 10.

The solution for the threshold problem is to calculable the thresholds in the office. The mean sets the lower threshold so that if the operator obtains a score below this then the operator is below average. For the upper threshold, the threshold for the top 10% of operators can be found. The data used to calculate these thresholds is all the date for each KPI without segmentation. The threshold is then the average score of the thresholds over the KPIs. This means that we have a set threshold for all KPIs and one that does not vary from cycle to cycle.

The score for the KPI using the Linear Ranking Model is the ratio between the value and the difference of the minimum and maximum. This value is then multiplies by 10 to produce the KPI score. The following equation shows the calculations required:

$$\text{score} = 10 \times \frac{\text{value} - \text{minimum}}{\text{maximum} - \text{minimum}}$$

TABLE 1 below shows the advantages and disadvantages of the LRM and LBG methods for generating the distributions.

TABLE 1

| Issue | Gaussian Model | Linear Ranking Model |
|---|---|---|
| Normal Gaussian curve | Models this well. | Will have a small problem in that most of the values concentrate around the mean so it is less likely for an operator to achieve above 80% and less than 20%. This can be addressed by lowering the thresholds. Conceivably, these thresholds could be set dynamically in the office. |
| Skewed Data (After using KPIs for a while) | May have a problem if a lot of the operators show an increase in performance. The worst of the best will | Will handle this well. |

TABLE 1-continued

| Issue | Gaussian Model | Linear Ranking Model |
|---|---|---|
| | actually be penalised by only receiving an average score. | |
| Low amount of data | Will only model the data that it is given. | Same problem as the Gaussian Model but can be fixed by applying manual limits. |
| Spurious data | Handles this automatically. | Filtering will need to be applied to remove the outlying data. Taking the mean and removing any data more than 3 standard deviations from the mean will help this. |
| Maths | Requires a clustering algorithm to model the data. | Simple minimum and maximum after applying a simple Gaussian curve to filtered data. Upper and lower constraints can also be applied. |
| Other | Once implemented, the way the data is represented cannot be changed easily. | The way the limits are calculated can be changed with no changes to the on-board system. |

The parameters represented by KPIs and their dependent parameters are:

1. Swing Production=Load Weight/Swing Time
   Swing Angle
   Hoist Dependent Swings
2. Fill Production=Load Weight/(Fill+Spot Times)
   Start Fill Reach
   Start Fill Height
3. Return Time
   Swing Angle
4. Production Performance
   This is a weighted sum of the 3 KPIs above.
5. Machine Reliability Hence, there are 5 KPIs and 4 different dependent parameters. The Hoist Dependent Swings parameter does not require segmentation at all, as it is a Boolean. That leaves only 3 dependent parameters for which segmentation needs to be described.

However, it will be appreciated that the present invention is not limited to the particular KPIs specified above, the number of KPIs, nor the different dependent parameters. It is envisaged that other parameters and KPIs and combinations thereof may be utilized in future, depending particularly on, for example, the particular application.

Figure 2:
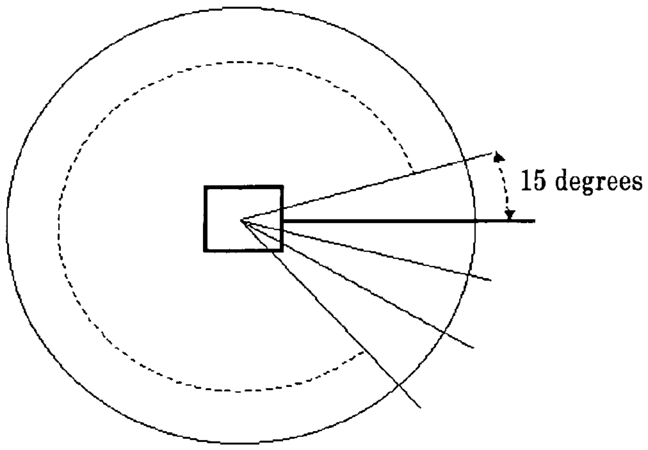
FIG. 2 is a schematic plan view of a machine showing segmentation resolution for the swing angle parameter.

In accordance with the present invention, a segmentation resolution is set for each dependent parameter in the data structure, except for the Hoist Dependent Swings parameter as previously explained. The segmentation resolution specifies the relevant variable(s), such as distance, angle, and the like, for a single segment. For example, if the segmentation resolution for Swing Angle were 15 degrees, then data would be extracted for each 15-degree segment, an indicated In FIG. 2. Only four segments are shown in FIG. 2. A weighted sum of the first 3 KPIs may then be calculated to obtain an overall production performance rating.

Segmentation is performed from a single known point (such as the origin in the case of the Start Fill Reach and Height). The data is then segmented from this point based on the segmentation resolution as explained above. Segments continue until the maximum or minimum limit is reached.

Figure 4:
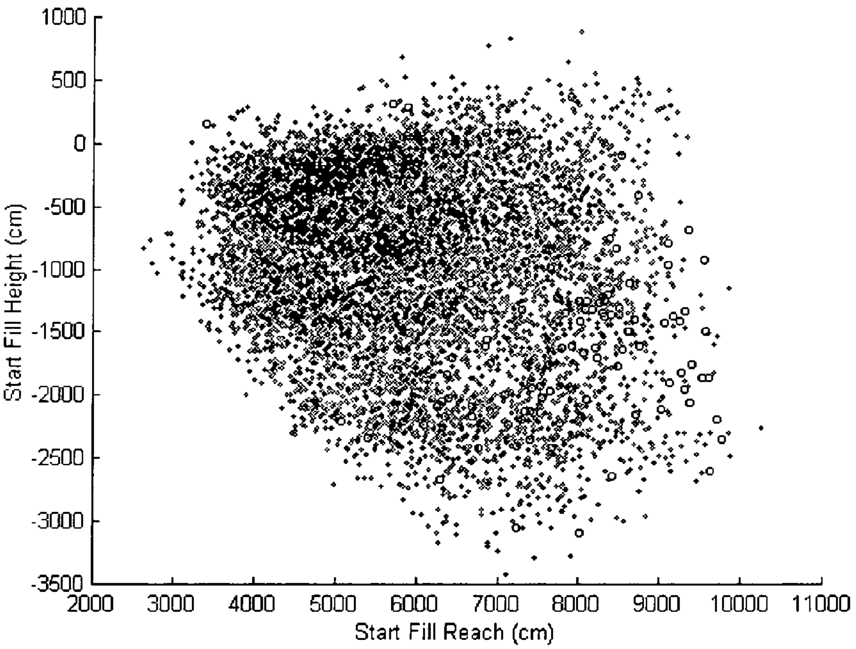
FIG. 4 shows dragline data for the parameters start fill reach versus start fill height.

For example, FIG. 4 shows fill time data for different Fill and Heights. In the order of darkest to lightest shading of the data points, the points represent fill time, t, of $t \leqq 10s$; $10<t \leqq 20s$; $20<t \leqq 30s$; and $t \geqq 30s$. The segments would be divided such that they start at 0 cm and extend out to the 10,000 cm extremity for Fill Reach. For Fill Height; the segments would extend up to the 1,000 cm extremity and down as far as the −3,500 cm extremity.

The reason to perform the segmentation in this way is so that the distributions represent a fixed set of conditions even after a period of time. This way, data that was logged, for example, a month ago can be fairly compared with current distributions.

Figure 8:
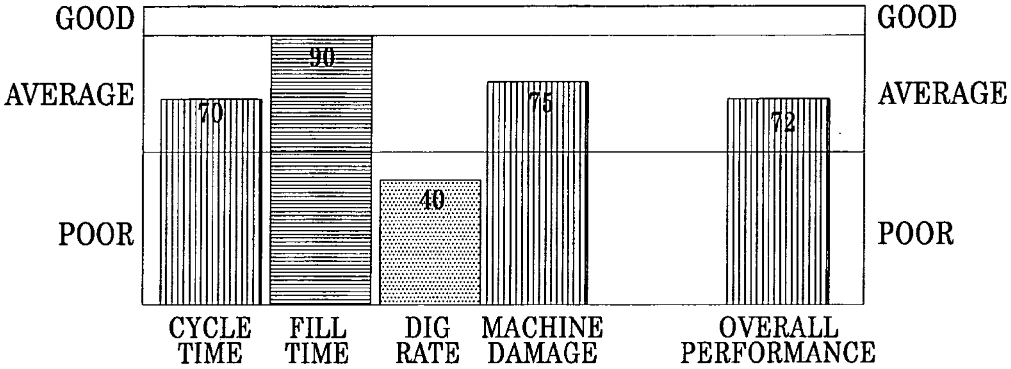
FIG. 8 shows a display of KPIs shoving current real-time performance.

Another setting for the KPIs related to the segmentation is the calculation of a probability from the distribution. If a better performance is achieved by a lower KPI value, the right side of the distribution needs to be calculated to obtain the KPI, as shown in FIG. 8. The Return Time KPI is an example of such a KPI. The left side of the distribution is calculated when a KPI value is required to be higher to achieve better performance. The Swing Production and Fill Production KPIs are examples of such a KPI.

Figure 6:
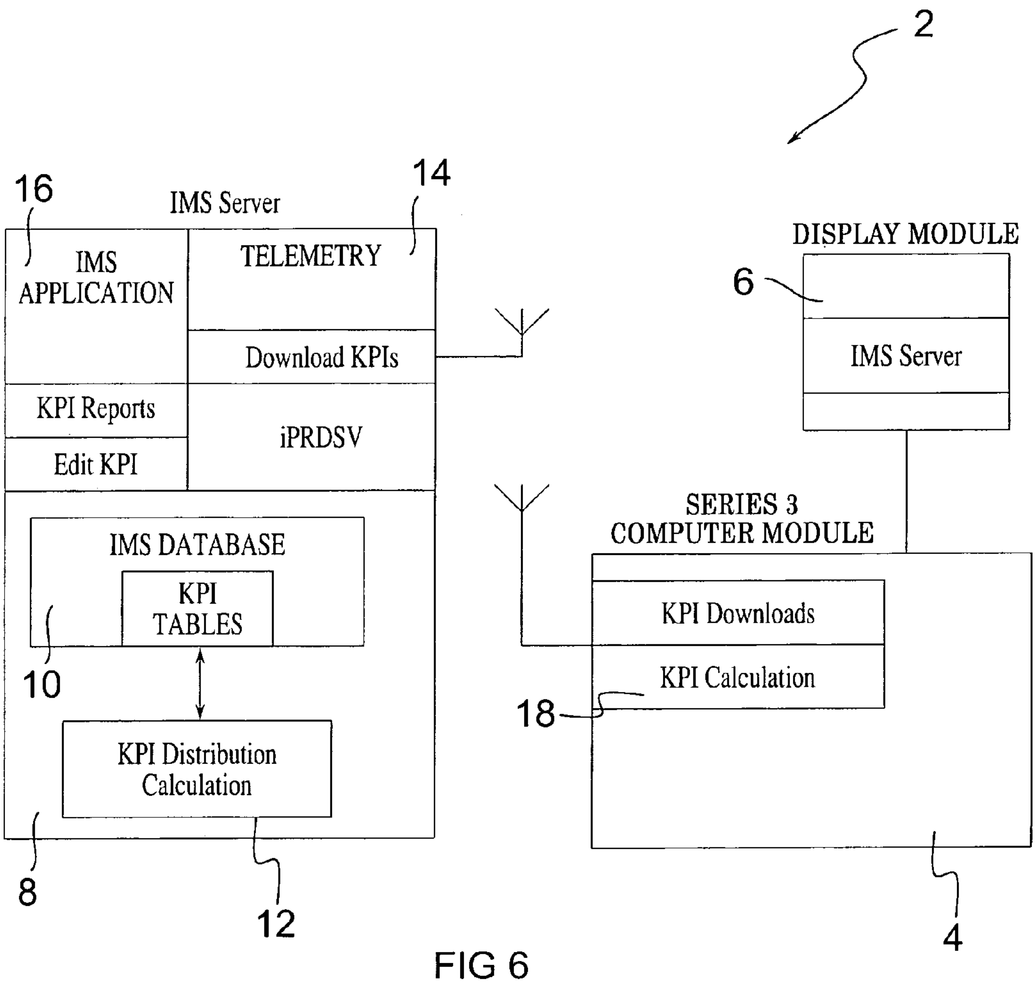
FIG. 6 is a schematic representation of an integrated Mining Systems (IMS) system structure employed in the present invention.

FIG. 6 shown the structure of an integrated Mining Systems (IMS) system 2. A Series 3 Computer Module 4 and associated Display Module 6 are located in each machine being monitored on site. An IMS server 8 may also be located on site, for example in the site office, or it may be located at some other remote location providing communication within the Telemetry constraints is possible. The IMS server 8 comprises storage means in the form of a database 10, calculation means in the form of KPI distribution calculation module 12, communication means in the form of telemetry module 14 and application module 16 for the generation and editing of KPI reports.

The Database 10 also needs to store the KPI Distributions that are generated from the cycle data. A number of distributions are stored in the Database 10. The first set of Distributions model the data for that machine for all operators. A set of Distributions will then exist for each operator. The feedback onboard can then be compared to all operators for that machine or to the currently logged on operator.

An overview of the Database Structure is described below.

TABLE 2

| KPI Configuration Information |
|---|
| Contents |
| KPI Parameter ID |
| Text description of KPI |
| Maximum number of Mixtures in a segment |
| Left/Right distribution |
| Length of moving average filter |

Figure 5:
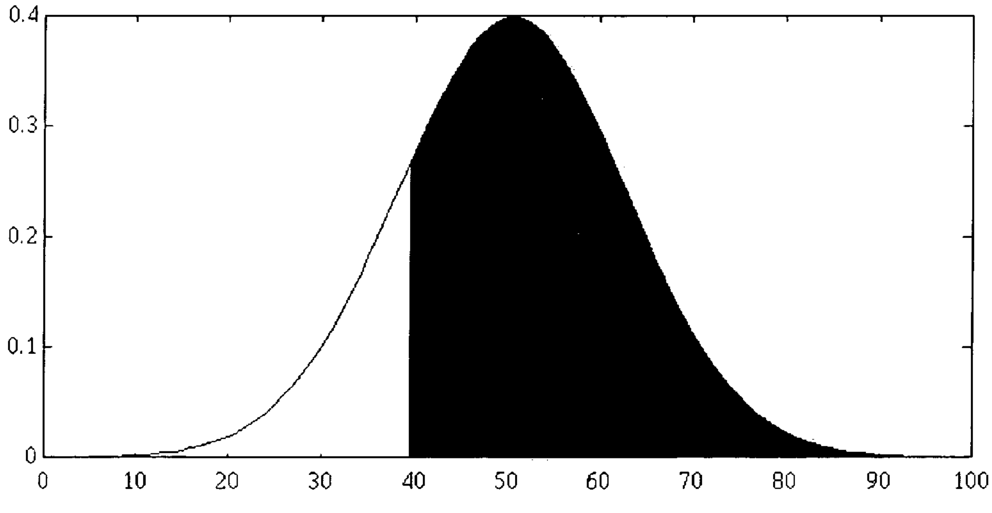
FIG. 5 shows calculation of a KPI for the right side of the distribution.

The KPI Configuration information describes the global settings used In the system as shown in TABLE 2. The KPI Parameter ID identifies the parameter used in the calculation of the distributions and the comparisons. The text description is used to display the KPI name on the Reports/Form. The maximum number of mixtures is set here when using the LBG method. The maximum is likely to be 4, but this will probably vary depending on the KPI. The number of mixtures that are actually used can be smaller than this number. The Left or Right distribution value determines how to calculate the KPI onboard the machine. As discussed above with reference to FIG. 5, it is a left distribution, then it means that a higher KPI variable is required to obtain better performance, e.g. Return Time. A right distribution means that a lower KPI is required to obtain better performance, e.g. Swing Production. A moving average can be optionally applied to the KPI result.

TABLE 3

| Segment Information |
|---|
| Contents |
| The ID of this segment |
| KPI Parameter ID |
| ID of the machine |
| ID of the dig mode |
| ID of the bucket |
| ID of the operator |

The Segment Information contains all the combinations of machines, dig modes, buckets, and operators in the mine for each KPI and associated segments as shown in TABLE 3. The KPI Distribution Calculation routine inserts all the entries into this table after it has determined the segmentation of the data. The segment ID identifies the segment for the current KPI, machine, dig mode, and the like.

TABLE 4

| Segmentation Offset Information |
|---|
| Contents |
| ID of the machine |
| ID from Parameter Link Information |
| Offset of the segment (om, degrees, etc.) |

The Segmentation Offset Information contains the offset values for dependent parameters associated with a KPI as shown in Table 4. These need to be configures for each machine for which KPI distribution calculations will be performed.

TABLE 5

| Dependency Information |
|---|
| Contents |
| The ID of this segment |
| The ID of the dependent parameter |
| Lower limit of dependent parameter |
| Higher limit of dependent parameter |

The Dependency Information contains the high and low limits for each Distribution Calculation routine.

TABLE 6

| Distribution Information for the LBG method |
|---|
| Contents |
| The ID of this segment |
| Mixture weight of the distribution |
| Mean of the distribution |
| Standard Deviation of the distribution |

The Distribution Information contains the distribution models for each of the segments. The information stores here depends on the distribution calculation method that is employed.

For the LBG method, TABLE 6 shows the information that is used. For each segment the mixture weight, mean and standard deviation are stored for each mixture within the segment.

TABLE 7

| Distribution Information for the LRM method. |
|---|
| Contents |
| The ID of this segment |
| Maximum distribution value |
| Minimum distribution value |

For the LRM method, TABLE 7 shows the information that is used. For each segment the maximum and minimum distribution values are stored.

TABLE 8

| Parameter Link Information |
|---|
| Contents |
| KPI Parameter ID |
| The ID of a parameter |
| Specifies whether or not the parameter is dependent |

The Parameter Link Information shown in TABLE 8 is used to allow parameters to be associated with a KPI. Values for associated parameters that are not dependent will be added to values for the KPI. Other parameters are dependent parameters.

TABLE 9

| Parameter Information |
|---|
| Contents |
| The ID of a parameter |
| Text description of the parameter |

The Parameter Information shown in TABLE 9 is used to identify the KPI Parameter ID with which the parameter is associated. This is used to identify which KPI parameter and dependent parameters are used in the modeling.

The KPI Distribution Calculation routine is an NT service that is scheduled to run on a periodic basis.

The program collects the data, segments it and calculates the distributions for each segment and stores the results in the Database 10. While this program is running the system (mainly Telemetry module 14) knows not to acquire any of the data from any of the KPI tables. This is because this program may take an order of hours to calculate all the data. It may be necessary to set the priority of this task to low in the system in case the processing time is significant.

The requirements for Telemetry are simple and would generally be familiar to a person skilled in the art. The onboard computer module 4 shown in FIG. 6 needs to request the KPI parameters that are currently in the database, but only if they have been changed. The onboard module 4 will request the data for example, every 8 hours. If the KPI Distribution Calculation routine is running Telemetry needs to instruct the onboard module 4 to defer the request until later. It does this by setting a KPI timestamp in the reply packet to zero.

The timestamp when the data was last changed is recorded in a table in the database. The onboard module 4 will send an initial KPI request packet as described later herein. Telemetry replies with the basic KPI configuration data and the timestamp of when the service last ran. If the service is running the timestamp is set to zero. The timestamp is also sent with every packet during the download so that if the service starts while downloading, the onboard module 4 can detect that the timestamp has gone to zero and it can abort the download.

The Telemetry Structure will now be described.

The onboard module 4 sends a KPI Configuration Request packet to Telemetry module 14 to request the KPI configuration. Telemetry module 14 replies with a KPI Configuration packet, for which the contents are shown in Table 10. It places the timestamp in which the KPI Distribution Calculation Routine last ran into this packet. The onboard module then compares this timestamp with the one it has to see if it needs to start downloading the KPI segments.

TABLE 10

| KPI Configuration Packet<br>Contents |
|---|
| The timestamp of when the data was last updated. |
| Number of KPIs in the database |
| The index of the KPI that we are replying to. |
| KPI Parameter ID |
| Number of taps in the Moving average filter to apply to KPI output. |
| The good to excellent threshold score (%) |
| The poor to good threshold score (%) |

A KPI Segment Request packet, as shown below in Table 11, requests the data (distributions and the like) from Telemetry module 14. The reason for including the Dig Mode ID, bucket ID and the operator ID in the packet is to enable prioritization of the download of the KPI distributions if required.

The first packet contains a segment_index of 1 to request the first segment and subsequent packets contain the next segment that the system wants. The requests stop when all the Segments for that machine have been downloaded.

TABLE 11

| KPI Segment Request packet<br>Description |
|---|
| KPI Parameter ID |
| Index to the segment for this KPI. |
| The current dig mode entered on the machine. |
| The current bucket on the machine. |
| The currently logged on operator. |

A KPI Segment packet shown in Table 12 below is the reply to the KPI segment request packet. If there is no distribution for the segment, then the Distribution information contains nothing.

TABLE 12

| KPI Segment packet<br>Contents |
|---|
| The timestamp of when the data was last updated. |
| The Total number of segments for this KPI (including ALL dig modes and ALL buckets and ALL operators). |
| KPI Parameter ID |
| Dig mode ID of this distribution |
| Bucket ID for this distribution |
| Operator ID for this distribution |
| The Segment ID |

TABLE 12-continued

| KPI Segment packet<br>Contents |
|---|
| Distribution Information |
| The Production contribution of this segment |
| Number of dependent parameters in this segment |
| First dependent parameter ID |
| Lower limit of the dependent parameter |
| Higher limit of the dependent parameter |

The Series 3 Computer Mode 4 shown In FIG. 6 needs to download the KPI configuration and distribution information from the server 8, which is stored onboard in Flash memory. Once this information is downloaded, performance indicator calculation module 18 of onboard computer module 4 is responsible for calculating the KPI scores after every cycle as previously described herein. If the LBG algorithm method described above is being used, a Gaussian lookup table may be used to calculate the Gaussian curve instead of using the Gaussian distribution equation specified above.

In order for the Series 3 Computer Module 4 to calculate the operator's score, it firstly selects the distribution by determining the segment that the current cycle matches for the particular KPI. Once the distribution has been found, then the KPI score can be calculated. If there exists no distribution to calculate a KPI, then the KPI score will be 100% (or 10 if the LRM is being used).

The scores for all the KPIs are calculated for both the mine and current operator comparison. Therefore, there are 2 scores that need to be calculated for every KPI.

The KPI can be displayed on display module 8 as a real-time parameter in the parameter list on a STATS screen. It may also be displayed as a trend so that the operator can see any performance improvements or deteriorations. The trend may be configured by the operator to show the graph for the last hour or the current shift or other suitable period. This is performed using the KPI trend configuration that is displayed once the operator selects one of the trend graphs from a menu displayed on the STATS screen.

Figure 7:
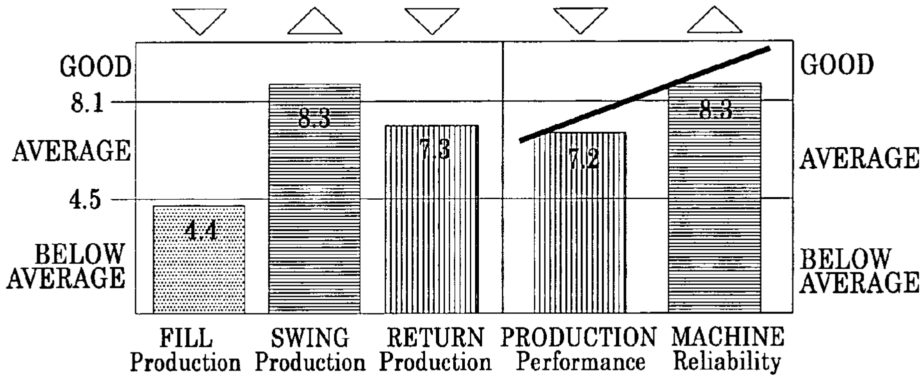
FIG. 7 shows a display of KPIs showing current real-time performance and a comparison with performance for a previous cycle.
Figure 9:
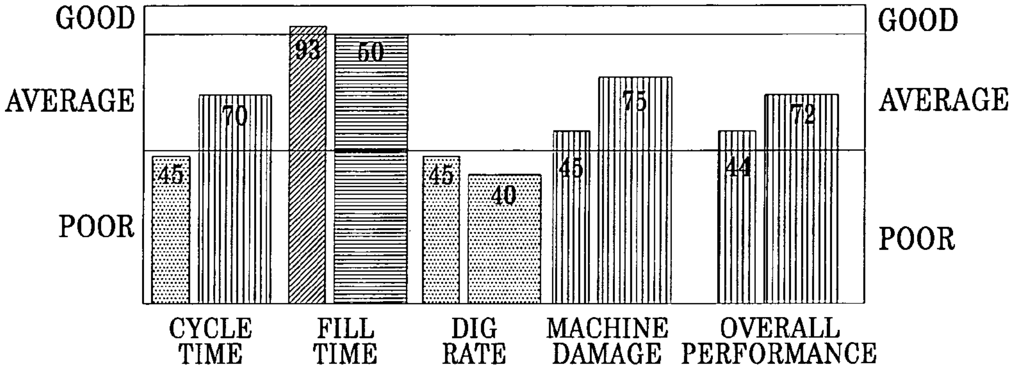
FIG. 9 shows an alternative display of KPIs showing both current real-time performance and performance for a previous cycle.

A third option is to display a KPI indicator that is again selected in the trend configuration. Three different designs for the indicator are shown In FIGS. 7-9. The KPI indicator could appear white against a black background to enhance visibility. FIG. 7 shows the current real-time performance. The arrows above each KPI indicate whether or not the score has improved from the last cycle. The extent to which the KPI has improved or deteriorated may also be shown. FIG. 8 shows an alternative method of displaying the real-time KPI scores for each of the KPI variables including an overall performance rating, which may be the average of the KPI variable. FIG. 9 shows an alternative way of displaying the scores for the previous cycle so that the operator can judge any improvements or deteriorations from cycle to cycle. This version could include more than just the last cycle.

The IMS Application module 16 preferably supports editing of at least some of the KPI Parameters. The following parameters need to be available to an administrator for editing: KPI text description: the setting of the good and average thresholds for the KPI indicator frequency of running the KPI Distribution Calculation routine (KPI Statistical Generator); number of days of previous data to be used to create the models; display of the last time the KPI data was updated and the like.

Figure 10:
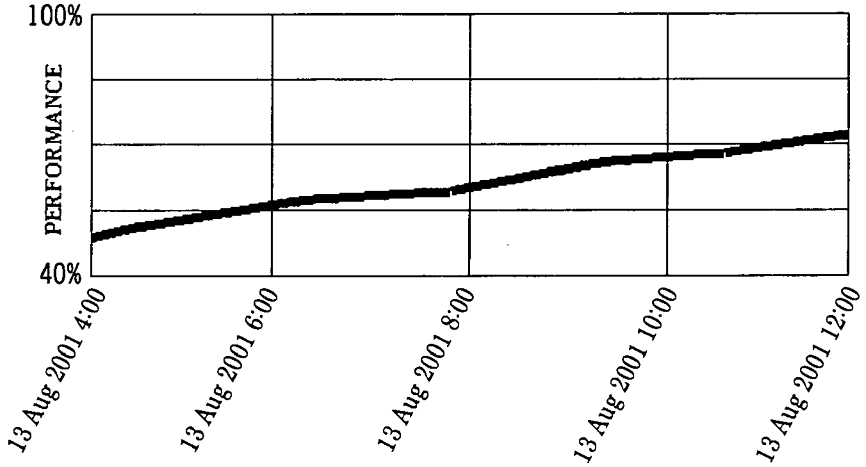
FIG. 10 shows an Operator Performance Trend Report.
Figure 10:
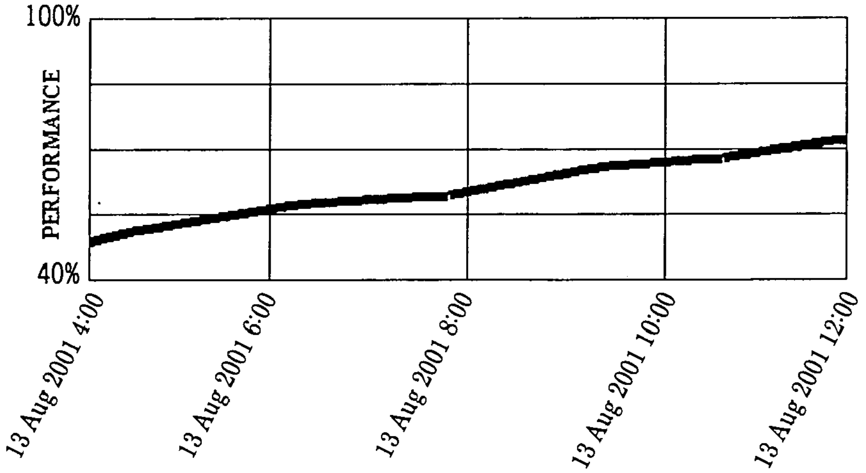

Reports, such as an Operator Performance Trend Report and an Operator Ranking Report, as shown in FIG. 10 and FIG. 11 respectively, may also be generated from the Report Manager in the IMS Application.

The Operator Performance Trend report shows the graphical trend of an operator for each of the KPI variable. The options that should be made to the person generating this report should include: Soft by machine, Sort by dig mode, Sort by bucket, Set Time period, Number of operators to show (top, specified number or all) and the KPIs to show.

The Operator Performance Trend report needs to calculate the KPI values over the selected time period based on the distributions contained in the Database at the time. Therefore, the KPI scores need to be calculated again. The reason for this is that the scores that were shown to the operator onboard are no longer valid because the distributions would have changed during that time and therefore cannot be compared to each other. Because the Report Manager has to do these calculations, the report may take a long time. Therefore the time period over which the trends are calculated will have to be limited.

The operator Ranking report displays the ranking of operators for each of the KPIs. That is, for a particular KPI or all KPIs, it displays the ranking of all the operators. The time period needs to be selected and, as for the previous report, this time period will have to be limited as the report may take a long time to run. This report needs to calculate what the previous report calculated, but needs to average the output screen.

The options that should be made to the person generating this report should include: Sort by machine, Sort by dig mode. Set Time period, Number of operators to show (top, specified number or all), The KPIs to show.

An Average Production KPI may be provided that may be calculated remotely and downloaded to the Series 3 computer module in the machine. This may be displayed on the performance graphs to show the operator their current performance relative to their average. This value can be downloaded along with the operator ID lists.

Current practice used by all mines estimating operator performance on the basis of Productivity appears to be wrong. Under different conditions and production plans some of the operators could be disadvantaged against others. For example, if an operator works in the same conditions, but with different swing angles from another operator, productivity shown for the greater swing angle will be less than for smaller swing angle, even though the first operator may in reality be more efficient.

Taking into account that the number of effecting factors could include a number of other parameters the applicant has identified that in order to be able to compare product ranks of the same operator under different conditions, some integrated value that could be used for ranking purposes should be used.

In order to be able to calculate average rank for operators working under different conditions. Integration performance ranks achieved under different conditions by different operators should be considered on the one hand and mine interests and production performance should be considered on another hand.

The suggested method of the present invention in this regard will include these 2 parameters as variables and will allow calculation of average operator rank, which could be used as a universal rank among the mine for different machines, conditions and production plans.

The formula for calculation of average operator rank is presented below:

$$Av\ Op\ Rank = W_1{*}R_1 + W_2{*}R_2 + \ldots + W_1{*}R_1$$

where:

$W_1$—Weight coefficient for Parameter Subset i, which is calculated on the basis of statistical information for the mine indicating the weight of I Parameter subset for the mine applicable to operator 1: and $R_i$—Rank of the operator i achieved for this Parameter Subset i.

For example, let it be assumed that during a reporting period a mine used only four different subsets of parameters. The weight of each subset could respectively be the following: 25%, 20%, 40% and 15%. It operator #1 worked only under subset #1 and #2 and achieved 90% for subset #1 and 94% for subset #2, using the above formula the average rank for the operator may be calculated:

$$Av\ Op\ Rank = \frac{25}{45} \times 90\% + \frac{20}{45} \times 94\% = 91.8\%$$

For Operator #2, subset #3=92% and subset #4=90%. Hence:

$$Av\ Op\ Rank = \frac{40}{55} \times 92\% + \frac{15}{55} \times 90\% = 91.45\%$$

These Productivity ranks do not include Production figures and only rank operators for different subsets of parameters. In reality, if, for example, operator #1 was doing cycles with swings of say 10 and 20 degrees and operator #2 swings of say 170 and 180 degrees, then the real production for operator #1 could be twice as much as for operator #2, but in fact the rank of operator #1 higher and accordingly he is better.

It is also conceivable that the average performance of an operator over the last week or month could be shown. The average performance could be calculated remotely and the onboard module would download it to the machine for every operator. It would be treated just as a list download where one radio packet represents one graph. Only the minimum and maximum values need to be sent and then each of the data points can be percentage scaled.

Accurately determining one or more of the KPIs in accordance with the present invention addresses the difficulties of accurately measuring relevant parameters and producing fair comparisons. The present invention can be used to improve awareness of how well the operators are performing and provide an incentive to improve performance. It also provides an indication to management about who is performing well and which operators are not performing up to standard.

Throughout the specification the aim has been to describe the invention without limiting the invention to any one embodiment or specific collection of features. Persons skilled in the relevant art may realize variations from the specific embodiments that will nonetheless fall within the scope of the invention.

The invention claimed is:

1. A method for monitoring performance of at least one machine operator, said method including the steps of:

measuring at least one machine parameter during operation of the machine by the operator, said at least one machine parameter related to the operation of the machine by the at least one machine operator;

segmenting at least one machine parameter that is a dependent machine parameter into segments where at least one dependent machine parameter exists, the range of each segment constituting a segmentation resolution;

generating at least one performance indicator distribution from measurements of the at least one machine parameter, said at least one performance indicator distribution comprising a range of values for a performance indicator derived from said at least one machine parameter;

calculating at least one performance indicator for the at least one machine operator from the at least one performance indicator distribution;

displaying the calculated performance indicator; and monitoring the performance of the at least one machine operator using the at least one calculated performance indicator.

2. The method of claim 1, further including the step of providing feedback to the operator by displaying the at least one performance indicator in substantially real-time to the operator.

3. The method of claim 1, further including the step of providing feedback to the operator by displaying the at least one performance indicator to the operator once the machine has completed an operation cycle.

4. The method of claim 1, wherein the at least one machine parameter is a dependent machine parameter.

5. The method of claim 1, wherein the at least one machine parameter is the sole parameter represented by a particular performance indicator.

6. The method of claim 1 wherein the step of segmenting at least one of the dependent machine parameters includes specifying a magnitude of the range for each segment of each dependent machine parameter requiring segmentation.

7. The method of claim 4, wherein at least one dependent machine parameter does not require segmentation.

8. The method of claim 1, wherein the step of generating the at least one performance indicator distribution includes using a mixture of one or more distributions to model the performance indicator distribution.

9. The method of claim 8, wherein the number of mixtures is set dynamically.

10. The method of claim 1, wherein the at least one performance indicator distribution is generated using an algorithm.

11. The method of claim 10, wherein the algorithm is a Linde-Buzo-Gray (LBG) algorithm.

12. The method of claim 1, wherein the at least one performance indicator distribution is generated using a linear ranking model (LRM).

13. The method of claim 1, wherein two or more performance indicators are combined to yield an overall performance rating of the machine operator.

14. The method of claim 13, wherein one or more of the performance indicators are positively or negatively weighted with respect to the other performance indicator(s).

15. A system for monitoring performance of at least one machine operator, said system comprising:

at least one measuring device for measuring at least one machine parameter during operation of the machine by the operator, said at least one machine parameter related to the operation of the machine by the at least one machine operator;

a server for segmenting at least one machine parameter that is a dependent machine parameter into segments where at least one dependent machine parameter exists, the range of each segment constituting a segmentation resolution and for generating at least one performance indicator distribution from measurements of the at least one machine parameter, said at least one performance indicator distribution comprising a range of values for a performance indicator derived from said at least one machine parameter;

a performance indicator calculation module for calculating at least one performance indicator for the at least one machine operator from the at least one performance indicator distribution;

a storage unit for storing the calculated performance indicator; and a display device for displaying the calculated performance indicator, wherein the calculated performance indicator for the at least one machine operator is used to monitor the performance of the at least one machine operator.

16. The system of claim 15, wherein the server is remote from the machine.

17. The system of claim 15, wherein the server comprises:

storage means;

communication means; and a performance indicator distribution calculation module.

18. The system of claim 15, wherein the performance indicator calculation module is onboard the machine.

19. The system of claim 15, wherein the performance indicator calculation module is coupled to communication means for transmitting and receiving data to and from the server.

20. The system of claim 15, wherein the at least one display device displays the at least one performance indicator in substantially real-time to the operator.

21. The system of claim 15, wherein the at least one display device displays the at least one performance indicator to the operator once the machine has completed an operation cycle.

22. The system of claim 15, wherein the at least one display device is onboard the machine.

23. The system of claim 15, wherein the at least one display device is remote from the machine.

* * * * *